United States Patent
Zhang (10) Patent No.: US 12,401,567 B2
(45) Date of Patent: Aug. 26, 2025

(54) SERVER MANAGEMENT METHOD, APPARATUS AND SYSTEM, AND ELECTRONIC DEVICE AND READABLE STORAGE MEDIUM

(71) Applicant: SUZHOU METABRAIN INTELLIGENT TECHNOLOGY CO., LTD., Jiangsu (CN)

(72) Inventor: Xiubo Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,640

(22) PCT Filed: Nov. 23, 2022

(86) PCT No.: PCT/CN2022/133825
§ 371 (c)(1),
(2) Date: Jun. 27, 2024

(87) PCT Pub. No.: WO2024/007510
PCT Pub. Date: Jan. 11, 2024

(65) Prior Publication Data
US 2025/0175388 A1    May 29, 2025

(30) Foreign Application Priority Data
Jul. 8, 2022   (CN) .......................... 202210797126.0

(51) Int. Cl.
G06F 13/42   (2006.01)
G06F 13/40   (2006.01)
(Continued)

(52) U.S. Cl.
CPC ...... *H04L 41/0893* (2013.01); *G06F 13/4063* (2013.01); *G06F 13/4282* (2013.01); *G06F 13/385* (2013.01); *G06F 2213/0002* (2013.01)

(58) Field of Classification Search
CPC ......... G06F 2213/0002; G06F 13/4282; G06F 11/3058; G06F 13/4063
See application file for complete search history.

(56) References Cited

U.S. PATENT DOCUMENTS 10,938,660 B1 *   3/2021   Kapur ..................... H04L 41/22
2013/0326278 A1   12/2013   Yin et al.
(Continued)

FOREIGN PATENT DOCUMENTS

CN   102281254 A   12/2011
CN   103455455 A   12/2013
(Continued)

OTHER PUBLICATIONS

EP22950068.1 extended European search report dated Feb. 19, 2025.

*Primary Examiner* — Tom Y Chang
(74) *Attorney, Agent, or Firm* — IPro, PLLC (57) ABSTRACT

A server management method, apparatus and system, an electronic device and a non-transitory readable storage medium are provided by the present application. The server management system includes a target physical interface, a baseboard management controller (BMC) monitoring management chip, and a state control switcher, wherein the BMC monitoring management chip includes a serial port function interface and a network function interface; the BMC monitoring management chip is connected to the target physical interface through the serial port function interface, and the target physical interface operates in a serial port management mode; the BMC monitoring management chip is connected to the target physical interface through the net- (Continued)

work function interface, and the target physical interface operates in a network management mode.

6 Claims, 3 Drawing Sheets

(51) Int. Cl.
*H04L 41/0893* (2022.01)
*G06F 13/38* (2006.01)

(56) References Cited

U.S. PATENT DOCUMENTS

| | | |
|---|---|---|
| 2016/0080210 A1 | 3/2016 | Lai et al. |
| 2019/0045654 A1* | 2/2019 | Abbondanzio ...... H05K 7/1494 |
| 2020/0142738 A1* | 5/2020 | Grobelny ................ G06F 21/78 |
| 2022/0107873 A1* | 4/2022 | Chaiken .............. G06F 11/3058 |

FOREIGN PATENT DOCUMENTS

| | | | |
|---|---|---|---|
| CN | 107357698 | A | 11/2017 |
| CN | 107908582 | A | 4/2018 |
| CN | 109947611 | A | 6/2019 |
| CN | 110362525 | A | 10/2019 |
| CN | 111737172 | A | 10/2020 |
| CN | 114866424 | A | 8/2022 |
| WO | 2016101408 | A1 | 6/2016 |
| WO | 2021082417 | A1 | 5/2021 |

* cited by examiner

SERVER MANAGEMENT METHOD, APPARATUS AND SYSTEM, AND ELECTRONIC DEVICE AND READABLE STORAGE MEDIUM

CROSS-REFERENCE TO RELATED APPLICATION

This application claims the priority of the Chinese Patent application filed on Jul. 8, 2022 before the China National Intellectual Property Administration with the application number of 202210797126.0, and the title of "SERVER MANAGEMENT METHOD, APPARATUS AND SYSTEM, AND ELECTRONIC DEVICE AND READABLE STORAGE MEDIUM", which is incorporated herein in its entirety by reference.

FIELD

The present application relates to the technical field of computers and, more particularly, to a server management method, apparatus and system, an electronic device and a non-transitory readable storage medium.

BACKGROUND

With the increasing demand of users for computer computing, the variety of device types is becoming more and more abundant. The management of servers in different scenarios is needed, that is, server management modes are also increasing. Correspondingly, the demand for server management is also increasing. In the related art, different interfaces are typically used to meet various management modes of users. For example, a registered jack (RJ) 45 network port is utilized to meet network management mode requirements of customers, while a D-type data interface connector (DB) 9 is employed to meet serial port management mode. This management mode may involve a great number of interfaces, and with the high-density requirements of a server, this management mode not only makes it difficult to meet the diverse management needs of users but also easy increases the maintenance cost of the entire server.

SUMMARY

A server management method, apparatus and system, an electronic device, and a non-transitory readable storage medium are provided by the present application, based on that the high-density requirements of the server met and the maintenance cost of the server is not increased, multi-mode and multi-scenario server management for users is achieved.

To solve the above technical problem, some embodiments of the present application provide the following technical solutions.

A server management system is provided by some embodiments of the present application, the server management system includes a target physical interface, a baseboard management controller (BMC) monitoring management chip, and a state control switcher;
wherein the BMC monitoring management chip includes a serial port function interface and a network function interface; the BMC monitoring management chip is connected to the target physical interface through the serial port function interface, and the target physical interface operates in a serial port management mode; the BMC monitoring management chip is connected to the target physical interface through the network function interface, and the target physical interface operates in a network management mode; and
the state control switcher is configured to switch the target physical interface to be connected to the serial port function interface or the network function interface through a pin based on a mode switching instruction.

In some embodiments of the present application, the target physical interface operates in the serial port management mode, the state control switcher is configured to switch the target physical interface to be connected to a system serial port through the pin based on a first serial port mode switching instruction to manage the server through the system serial port.

In some embodiments of the present application, the target physical interface operates in the serial port management mode, the state control switcher is configured to switch the target physical interface to be connected to a BMC serial port through the pin based on a second serial port mode switching instruction to manage the server through the BMC serial port.

In some embodiments of the present application, the target physical interface operates in the serial port management mode, and the state control switcher is configured to switch the target physical interface to be connected to the network function interface through the pin based on a network mode switching instruction to manage a server through a BMC network.

In some embodiments of the present application, the target physical interface operates in the network management mode, and the BMC is further configured to forward a received serial port mode switching instruction to the state control switcher; and
the state control switcher is configured to switch the target physical interface to be connected to a system serial port or a BMC serial port through the pin based on the received serial port mode switching instruction.

In some embodiments of the present application, the target physical interface is a Type-C interface.

A server management method applied to the state control switcher in the server management system according to any one of embodiments stated above is provided by some embodiments of the present application, which includes:
receiving the mode switching instruction; and
switching the target physical interface to be connected to the serial port function interface or the network function interface of the BMC monitoring management chip through the pin to respond to the mode switching instruction.

A server management method applied to the BMC monitoring management chip in the server management system according to any one of embodiments stated above is provided by some embodiments of the present application, which includes:
in response to receiving a server management instruction, determining whether to send a mode switching instruction to the state control switcher based on a current management mode and a target management mode corresponding to the server management instruction; and
in response to detecting that the current management mode is the target management mode, managing a server in a corresponding management mode through the target physical interface to respond to the server management instruction;
wherein the management mode includes the serial port management mode and the network management mode.

In some embodiments of the present application, determining whether to send the mode switching instruction to the state control switcher based on the current management mode and the target management mode corresponding to the server management instruction includes:

generating the mode switching instruction in response to the current management mode being different from the target management mode corresponding to the server management instruction; and sending the mode switching instruction to switch the target physical interface to be connected to the serial port function interface or the network function interface of the BMC monitoring management chip through the state control switcher.

In some embodiments of the present application, determining whether to send the mode switching instruction to the state control switcher based on the current management mode and the target management mode corresponding to the server management instruction includes:

directly responding to the server management instruction in response to the current management mode being the same as the target management mode corresponding to the server management instruction.

In some embodiments of the present application, before in response to receiving the server management instruction, determining whether to send the mode switching instruction to the state control switcher based on the current management mode and the target management mode corresponding to the server management instruction, the server management method further includes:

pre-constructing an instruction library, wherein the instruction library is configured to store a plurality of mode switching instructions; and in response to receiving a mode switching instruction adjustment request, updating the instruction library based on the mode switching instruction adjustment request.

A server management apparatus applied to the state control switcher in the server management system according to any one of embodiments stated above is provided by some embodiments of the present application, which includes:

a switching instruction receiving module, configured to receive the mode switching instruction; and a pin switching module, configured to switch the target physical interface to be connected to the serial port function interface or the network function interface of the BMC monitoring management chip through the pin to respond to the mode switching instruction.

A server management apparatus applied to the BMC monitoring management chip in the server management system according to any one of embodiments stated above is provided by some embodiments of the present application, which includes:

a management instruction receiving module, configured to receive a server management instruction;

a determination module, configured to determine whether to send the mode switching instruction to the state control switcher based on a current management mode and a target management mode corresponding to the server management instruction; and a server management module, configured to in response to detecting that the current management mode is the target management mode, manage a server in a corresponding management mode through the target physical interface to respond to the server management instruction, wherein the management mode includes the serial port management mode and the network management mode.

In some embodiments of the present application, the server management apparatus further includes an executing module, the executing module may include:

an instruction generation unit, configured to generate the mode switching instruction in response to the current management mode being different from the target management mode corresponding to the server management instruction; and an instruction sending unit, configured to send the mode switching instruction to switch the target physical interface to be connected to the serial port function interface or the network function interface of the BMC monitoring management chip through the state control switcher.

In some embodiments of the present application, the executing module may be configured to directly respond to the server management instruction in response to the current management mode being the same as the target management mode corresponding to the server management instruction.

In some embodiments of the present application, the server management apparatus further includes an instruction library and an instruction updating module;

the instruction library is configured to store a plurality of mode switching instructions; and the instruction updating module is configured to, in response to receiving a mode switching instruction adjustment request, update the instruction library based on the mode switching instruction adjustment request.

An electronic device is further provided by some embodiments of the present application, which includes: a processor, wherein the processor is configured to implement steps of the server management method according to any one of embodiments stated above, in response to executing the computer programs stored in the memory.

A non-transitory readable storage medium is further provided by some embodiments of the present application, wherein computer programs are stored on the non-transitory readable storage medium, the computer programs, in response to being executed by a processor, implement steps of the server management method according to any one of embodiments stated above.

The advantages of the technical solutions provided in the present application are that an operation mode of the target physical interface is cooperatively switched through the BMC and the state control switcher, it is realized that different management modes of the server are switched through the switching of the operation modes, and multiplexing of the network management mode and the serial port management mode is realized. Therefore, different management requirements, such as serial port management and BMC network management, may be provided for the user. The technical disadvantage of the related art of realizing multi-scenario and multi-mode management through only serial port multiplexing may be solved, not only multi-mode and multi-scenario management of the server is realized, the number of peripheral interfaces of the server is further effectively reduced, the high-density requirements of the server is met, and the maintenance cost of the server is facilitated to be reduced.

In addition, a corresponding implementation apparatus and system, electronic device, and non-transitory readable storage medium for the server management method are further provided by some embodiments of the present application, so that the method is more practical; the apparatus and system, electronic device, and non-transitory readable storage medium have corresponding advantages.

It should be understood that the general description above and the detailed description below are exemplary only and do not limit the present application.

BRIEF DESCRIPTION OF THE DRAWINGS

To explain some embodiments of the present application or the technical solutions in the related art more clearly, a brief introduction will be made to the drawings required to be used in the embodiments or the description of the related art. It is obvious that the drawings in the description below are only some embodiments of the present application, and a person skilled in the art may obtain other drawings according to these drawings without paying any creative work.

DETAILED DESCRIPTION

To enable a person skilled in the art to better understand the technical solutions of the present application, the present application will be described in further detail in combination with the drawings and implementations. Obviously, the embodiments described are only some embodiments of the present application and not all embodiments. All other embodiments obtained by a person skilled in the art based on the embodiments in the present application without paying any creative work shall fall within the scope of protection of the present application.

The terms "first", "second", "third", "fourth", and the like in the specification and the claims of the present application, as well as in the above drawings, are used for distinguishing between different objects and not for describing a sequence. Furthermore, the terms "include" and "have" and any variations of the two are intended to cover a non-exclusive inclusion. For example, processes, methods, systems, products, or devices that include a list of steps or units are not limited to the listed steps or units but may include steps or elements not listed.

After introducing the technical solutions of some embodiments of the present application, various non-limiting implementations of the present application are described in detail below.

Figure 1:
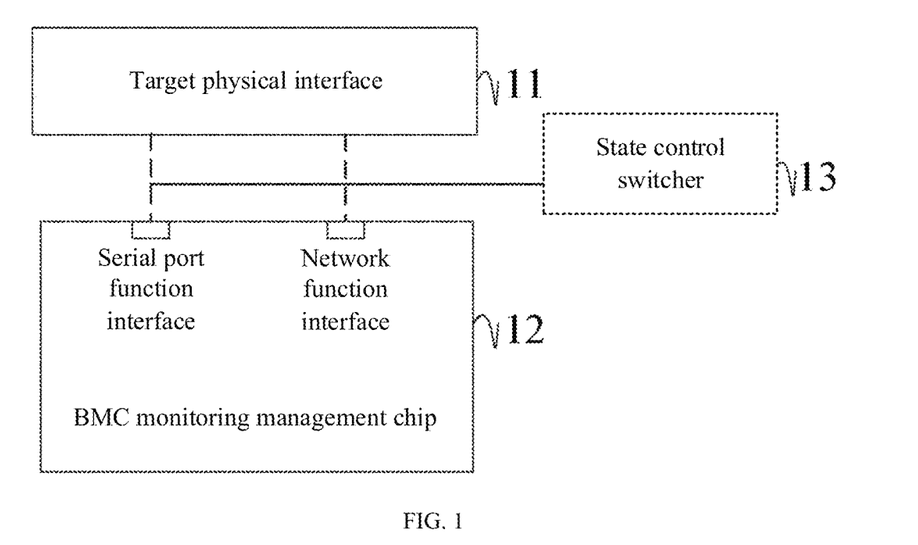
FIG. 1 is a structural diagram of an implementation of a server management system according to some embodiments of the present application.

Referring first to FIG. 1, FIG. 1 is a schematic diagram of a structural framework of a server management system under an implementation according to some embodiments of the present application, and some embodiments of the present application may include the following contents:

The server management system may include a target physical interface 11, a BMC monitoring management chip 12, and a state control switcher 13.

The target physical interface 11 of some embodiments of the present application is an external physical interface, which may be any type of physical interface supported by the server, such as a common universal serial bus (USB) interface of a Type-A, Type-B, and Type-C interface, and a person skilled in the art may flexibly select according to actual requirements. The target physical interface 11 may be either an existing physical interface on the server or a debugging interface developed in advance on the server, which does not affect the implementation of the present application.

It may be understood that each of the servers includes a baseboard management controller (BMC) for monitoring and managing the server, such as monitoring health, remote management, logging events and performing failure analysis, and deploying configuration, the BMC is independent of the server computing unit. The BMC may generally include two parts, a BMC monitoring management chip and a BMC firmware. One end of the BMC monitoring management chip has various types of interfaces such as general-purpose input/output (GPIO), peripheral component interconnect express (PCIE), universal serial bus (USB), low pin count bus (LPC), and university asynchronous receiver and transmitter (UART), and the other end has a management network port, a memory interface, a debugging interface, and the like. In some embodiments of the present application, one physical interface of the above interfaces may be defined in advance as a serial port function interface, such as UART, and the other physical interface is defined as a network function interface, such as USB. The BMC is connected to the target physical interface 11 through the network function interface or the serial port function interface, so that the target physical interface 11 may realize the management of the server under different management modes. The BMC monitoring management chip 12 may be connected to the target physical interface through the serial port function interface; based on this physical connection pathway, the target physical interface 11 operates in a serial port management mode, in this way, the user may realize serial port management of the server through the target physical interface. The BMC monitoring management chip 12 may be connected to the target physical interface 11 through the network function interface; based on this physical connection pathway, the target physical interface 11 operates in a network management mode, in this way, the user may realize network management of the server through the target physical interface 11.

In some embodiments of the present application, the target physical interface 11 operates in different operation modes in different physical link states, to realize the management of the server by using different management modes. In order to realize multi-mode management of the server and improve management efficiency, the above system further includes the state control switcher 13, which is configured to switch the target physical interface to be connected to the serial port function interface or the network function interface through a pin based on a mode switching instruction, namely, the state control switcher 13 controls which pin of the BMC monitoring management chip 12 is connected to switch to the serial port function interface or the network function interface. The mode switching instruction is an instruction issued by the user; the instruction is used for instructing to switch the server management mode, such as switching from the network management mode to the serial port management mode or switching from the serial port management mode to the network management mode; the instruction for instructing the mode switching may be pre-defined. After detecting the mode switching instruction, the state control switcher 13 may recognize based on the pre-defined meaning, and switch a corresponding pin of the BMC based on the management mode to be switched, so that the target physical interface 11 is connected to a matching interface. In practical applications, a computer program corresponding to the implementing method of the above state control switcher 13 may be encapsulated into any one of the computing chips, such as a complex programmable logic device (CPLD), micro control unit (MCU), programmable system-on-chip (PSOC), and field programmable gate array (FPGA), to realize the functions to be realized by the state control switcher through running a computer program, and a person skilled in the art may flexibly select the type of a collected chip according to actual requirements.

In the technical solutions provided by some embodiments of the present application, an operation mode of the target physical interface is cooperatively switched through the BMC and the state control switcher, different management modes of the server are switched through the switching of the operation modes, and multiplexing of the network management mode and the serial port management mode is realized. Therefore, different management requirements, such as serial port management and BMC network management, may be provided for the user. The technical disadvantage of the related art of realizing multi-scenario and multi-mode management through only serial port multiplexing may be solved, not only multi-scenario and multi-mode management of the server is realized, but also the number of peripheral interfaces of the server is further effectively reduced, the high-density requirements of the server are met, and the maintenance cost of the server is facilitated to be reduced.

Further, in order to realize the multi-scenario and multi-mode management of the server, based on the above embodiments, for the serial port management mode, two different serial port management modes are further provided by some embodiments of the present application; the serial port management mode may include a system serial port management mode, and system serial port information may be output in the mode; the serial port management mode may further include a BMC serial port management mode, and BMC serial port information may be output in the mode; accordingly, a serial port function interface may include a system serial port and a BMC serial port. Based on the above embodiments, some embodiments of the present application may further include:

the target physical interface 11 operates in a serial port management mode, and the state control switcher 13 is configured to switch the target physical interface to be connected to the system serial port through the pin based on a first serial port mode switching instruction to manage the server through the system serial port. The target physical interface 11 operates in a serial port management mode, and the state control switcher 13 is configured to switch the target physical interface 11 to be connected to the BMC serial port through the pin based on a second serial port mode switching instruction to manage the server through the BMC serial port.

In some embodiments of the present application, the first serial port mode switching instruction and the second serial port mode switching instruction may be pre-defined mode switching instructions, and the user issues the mode switching instruction to the system; after detecting the instruction, the state control switcher switches the corresponding pin of the BMC based on the management mode to be switched, so that the target physical interface 11 is connected to the matched interface.

After the above embodiments provide switching modes between different serial port management modes, some embodiments of the present application further provide switching modes between different management modes, which may include the following contents:

The target physical interface 11 operates in a serial port management mode, and the state control switcher 13 may further be configured to switch the target physical interface to be connected to the network function interface through the pin based on the network mode switching instruction to manage the server through the BMC network.

The target physical interface 11 operates in a network management mode, the user issues the serial port mode switching instruction to the BMC, and the BMC is also configured to forward the received serial port mode switching instruction to the state control switcher 13; the state control switcher 13 is configured to switch the target physical interface 11 to be connected to the system serial port or the BMC serial port through the pin based on the received serial port mode switching instruction.

In some embodiments of the present application, the network mode switching instruction and the serial port mode switching instruction may be pre-defined mode switching instructions, and the user issues the network mode switching instruction and the serial port mode switching instruction to the system; after detecting and recognizing the instruction, the state control switcher switches a corresponding pin of the BMC based on the management mode to be switched, so that the target physical interface 11 is connected to a matched interface of the BMC, and the target physical interface 11 is in a corresponding operation mode.

Figure 2:
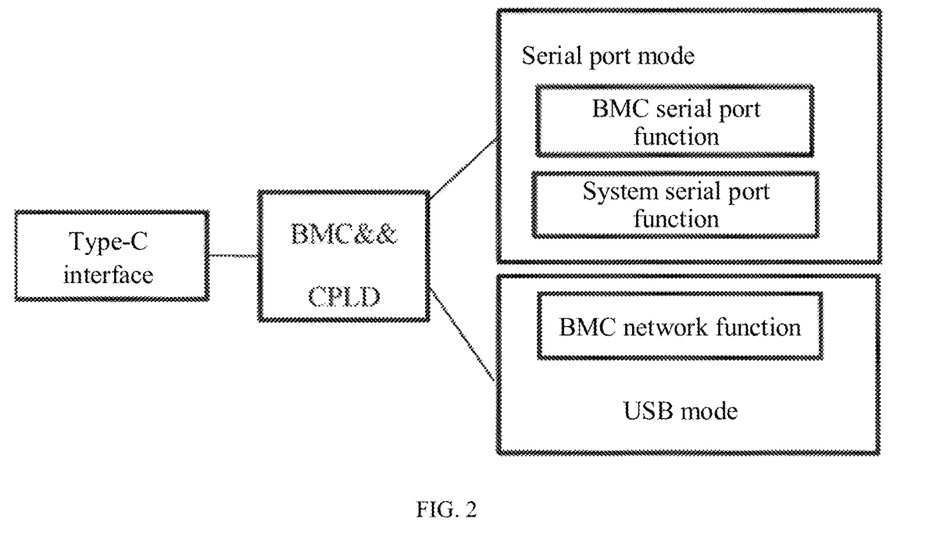
FIG. 2 is a schematic diagram of a framework of an exemplary application scenario according to some embodiments of the present application.

In order to make a person skilled in the art better understand the technical solution of the present application, the present application further provides a schematic example in combination with FIG. 2. In some embodiments of the present application, the server is provided with a BMC monitoring management chip and a Type-C interface, that is, in some embodiments of the present application, the Type-C interface is the target physical interface in the above embodiments, the state control switcher is the CPLD, the serial port function interface is the UART, and the network function interface is the USB interface; the BMC may be connected to the target physical interface, that is the Type-C interface, through the UART and the USB; and the CPLD may switch the BMC to be connected to the UART or the USB. The first serial port mode switching instruction is pre-defined as #@!¥%&1, the second serial port mode switching instruction is #@!¥%&2, and the network mode switching instruction is #@!¥%&3. In the related art, in response to the server being managed, only multiplexing of serial port debugging is achieved for outputting serial port debugging and inputting serial port debugging. The technical solution provided in the present application may not only break the multiplexing of the functions of BMC network management and serial port debugging but also overcome the technical disadvantages existing in the related art. In some embodiments of the present application, after the Type-C interface is connected, the user may directly perform network management on the BMC through the Type-C interface to realize multi-mode management of the server. Some embodiments of the present application may include the following contents:

The CPLD may switch the Type-C interface to be connected to the UART or the USB of the management chip of the BMC through the pin.

In the serial port mode, after the user inputs the first serial port mode switching instruction #@!¥%&1, CPLD may switch to the BMC serial port after detecting the serial characters and may manage the server through the BMC serial port in this mode.

In the serial port mode, after the user inputs the second serial port mode switching instruction #@!¥%&2, CPLD may switch to the system serial port after detecting the serial characters and may manage the server through the system serial port in this mode.

In the serial port mode, after the user inputs the network mode switching instruction #@!¥%&3, CPLD may switch to the BMC network mode after detecting the serial characters and may manage the server through the BMC network in this mode. For example, management in a network mode of the World Wide Web (Web), intelligent platform management interface (IPMI), Redfish (namely, a management standard based on hypertext transfer protocol over secure socket layer (HTTPS) services), and the like may be performed through a network.

In the network mode, the user may input the first serial port mode switching instruction to the BMC, the BMC transmits the same to the CPLD, and the CPLD switches to the BMC serial port mode.

In the network mode, the user may input the second serial port mode switching instruction to the BMC, the BMC transmits the same to the CPLD, and the CPLD switches to the system serial port mode.

As may be seen from the above, in some embodiments of the present application, the management of the server may unified through the Type-C interface, the multiplexing of the network management mode and the serial port management mode is realized, the requirements of server network management and serial port management are satisfied, and the number of peripheral interfaces used by the server is saved.

Figure 3:
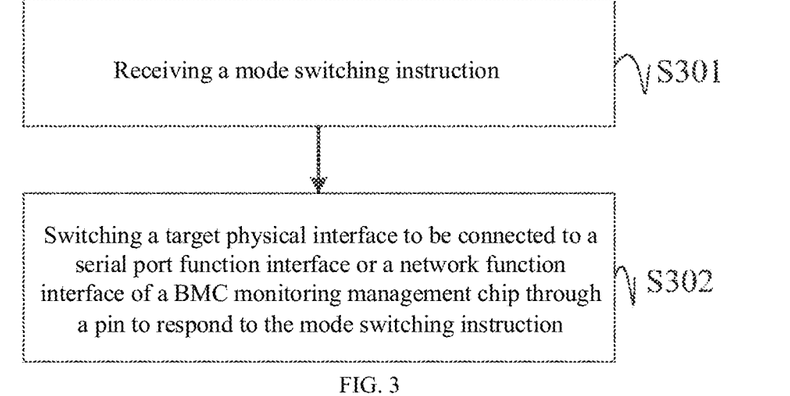
FIG. 3 is a flow chart of a server management method according to some embodiments of the present application.

Based on the above embodiments, the present application provides a related embodiment of the server management method from another perspective to explain the implementing process of multi-mode management of the server. Referring to FIG. 3, FIG. 3 is a flow chart of a server management method according to some embodiments of the present application, which may be applied to any one of the above embodiments of the server management system. The execution subject of some embodiments of the present application is a state control switcher of the server management system in any one of the above embodiments; during the executing process of the server management method, the state control switcher may include the following contents:

S301: receiving a mode switching instruction.

S302: switching a target physical interface to be connected to a serial port function interface or a network function interface of a BMC monitoring management chip through a pin to respond to the mode switching instruction.

In some embodiments of the present application, the user issues the mode switching instruction to the system, and the system may directly issue the mode switching instruction to the state control switcher, and may also make an initial determination; in response to that it is determined that mode switching is required, the mode switching instruction is forwarded to the state control switcher. In addition, the mode switching instruction may also be automatically generated by the system and sent to the state control switcher, namely, in a server management process, the user issues a server management instruction; a BMC monitoring management chip determines whether the mode switching needs to be performed on the basis of whether a current management mode is the same as a management mode currently desired by the user, namely, the target management mode corresponding to the server management instruction. If the current management mode is different from the management mode currently desired by the user, the mode switching needs to be performed, and the BMC monitoring management chip may issue a corresponding mode switching instruction to the state control switcher. For example, the server is currently in serial port mode, and the user would like to manage the server through the network mode, and the mode switching instruction for switching from the serial port mode to the network mode is #@!¥%&3, then #@!¥%&3 is sent to the state control switcher.

In response to that the state control switcher receives the mode switching instruction, it is determined whether the target physical interface should be connected to the serial port function interface of the BMC monitoring management chip or connected to the network function interface of the BMC monitoring management chip through the management mode needing to be switched; after determining the interface of the BMC monitoring management chip that the target physical interface is connected to, the target physical interface is switched to be connected to the corresponding interface of the BMC monitoring management chip through the pin to achieve the switching of different management modes.

Some embodiments of the present application have the same method or the same steps as the above embodiments, and reference may be made to the description of the above embodiments; therefore, the description will not be repeated here.

It may be seen from the above that some embodiments of the present application may realize multi-mode and multi-scenario management of the server by the user on the basis of satisfying the high-density requirements of the server without increasing the maintenance cost of the server.

Figure 4:
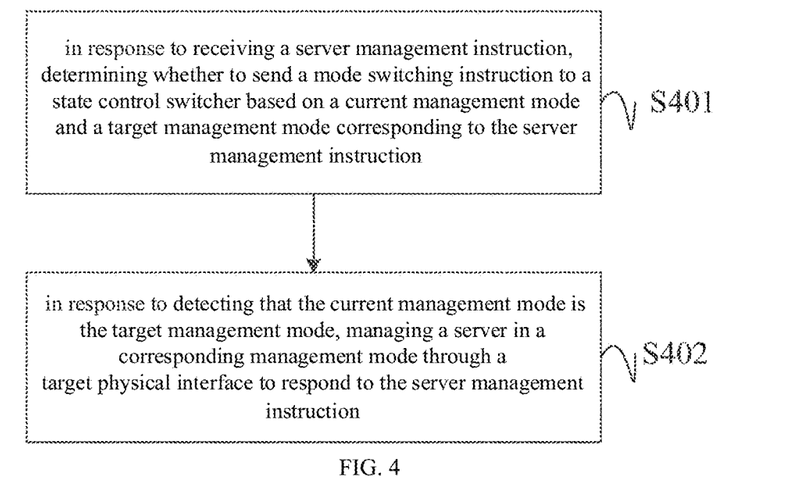
FIG. 4 is a flow chart of another server management method according to some embodiments of the present application.

Based on the above embodiments, the present application further provides a related embodiment of the server management method from another perspective to explain the implementing process of multi-mode management of the server. Referring to FIG. 4, FIG. 4 is a flow chart of another server management method according to some embodiments of the present application, which may be applied to any one of the above embodiments of the server management system. The execution subject of some embodiments of the present application is a BMC monitoring management chip of the server management system in any one of the above embodiments; during the execution of the server management method, the BMC monitoring management chip may include the following contents:

S401: in response to receiving the server management instruction, determining whether to send the mode switching instruction to the state control switcher based on the current management mode and the target management mode corresponding to the server management instruction.

S402: in response to detecting that the current management mode is the target management mode, managing a server in a corresponding management mode through a target physical interface to respond to the server management instruction.

An embodiment of S401, namely, "determining whether to send the mode switching instruction to the state control switcher based on the current management mode and the target management mode corresponding to the server management instruction", may be: generating a mode switching instruction in response to the current management mode being different from the target management mode corresponding to the server management instruction; sending a mode switching instruction to switch the target physical interface to be connected to the serial port function interface or the network function interface of the BMC monitoring management chip through the state control switcher. In response to the current management mode being the same as the target management mode corresponding to the server management instruction, the server management instruction is directly responded to.

In the present application, the user may adjust a server management mode in real time during a server management process, and the change of the server management mode may be directly realized through a mode switching instruction or by issuing the server management mode. The execution of the pin switch function by the state switch controller may be triggered in two ways, a mode switching instruction issued by the user and a mode switching instruction generated automatically by the system. That is, the user may directly issue a mode switching instruction in response to that the user would like to switch the server management mode. In response to that the state switching controller detects the mode switching instruction, the interface connection relationship between the target physical interface and the BMC monitoring management chip is directly changed based on the mode switching instruction. After the interface connection relationship is updated, the current system supports the management mode required by the user, and the user may directly manage the server in the required management mode. The user may also directly send an instruction carrying the required management mode, referred as a server management instruction in some embodiments of the present application, to the system in response to that the user would like to switch the server management mode. After receiving the server management instruction, the system obtains a server management mode matched with the instruction by parsing the server management instruction, which is referred to as a target management mode in some embodiments of the present application. The current management mode is obtained. In response to that the current management mode and the target management mode are not the same management mode, it indicates that the user would like to switch the management mode, then a mode switching instruction may be generated and issued to the state switching controller; the state switching controller changes the interface connection relationship between the target physical interface and the BMC monitoring management chip based on the mode switching instruction, and after the interface connection relationship is updated, the current system then supports the management mode required by the user, and the user may directly manage the server in the required management mode. In response to that the current management mode and the target management mode are the same, it indicates that the user would not like to switch the management mode, and the user may directly manage the server.

In some embodiments of the present application, the server management instruction is an instruction of the user to manage the server, and the user may issue the server management instruction to the system. In order to realize accurate management of the server, the system may first determine whether the server management mode to be realized by the server management instruction is the same as the operation mode of the current physical interface; the management mode may include a serial port management mode and a network management mode. In response to that the server management mode to be realized by the server management instruction is different from the operation mode or management mode of the current physical interface, the system may issue a mode switching instruction. In response to that the state control switcher detects the mode switching instruction, the target physical interface is connected to the corresponding interface of the BMC monitoring management chip by switching the pin. The server is then managed accordingly based on the server management instructions. In response to that the server management mode to be realized by the server management instruction is the same as the operation mode of the current physical interface, the user may directly perform corresponding management on the server based on the server management instruction. For example, the user integrates the requirements of different management interfaces such as network management and serial port management through a Type-C debugging port. The user issues a server management instruction through a BMC network management server, while the current Type-C debugging port is connected to the serial port function interface UART, then the system may issue a mode switching instruction such as #@!¥%&3, to switch the serial port mode to the BMC network management mode, and the user may perform management in a network mode such as Web, IPMI, and Redfish through a network. In response to that the user issues a server management instruction through the BMC serial port management server, and the current Type-C debugging port is connected to the system serial port, the system may issue a mode switching instruction such as #@!¥%&1, to switch to the BMC serial port and manage the server through the BMC serial port. The user issues a server management instruction through the system serial port management server, and the current Type-C debugging port is connected to the BMC serial port, then the system may issue a mode switching instruction, such as #@!¥% &2, to switch to the system serial port and manage the server through the system serial port. The user issues a server management instruction through the serial port management server, and the current Type-C debugging port is connected to the network function serial port USB, then the system may issue a mode switching instruction, such as an IPMI command, to switch from the network management mode to the serial port management mode. Through the above different switching modes, the management of the server in different application scenarios may be realized under the same Type-C physical interface.

It may be understood that the mode switching instruction of the present application may be automatically generated and issued to the state switching controller by the system based on the server management instruction, and accordingly, various mode switching instructions need to be pre-defined before the above method steps are executed, namely, the basis for implementing server management. In order to facilitate implementation, as an implementation, an instruction library may be pre-constructed in the system. The instruction library is used for storing a plurality of mode switching instructions, each mode switching instruction is pre-defined, and each mode switching instruction has a unique instruction identifier, and the instruction identifier may also identify a mode switching relationship at the same time. The mode switching relationship is used for indicating switching from which management mode to which management mode. That is, an association relationship between instruction content, instruction identifier, and mode switching relationship is established. In needing to generate a mode switching instruction, the system may locate the instruction content in the instruction library through the mode switching relationship, and then call the instruction to be used as the generated mode switching instruction.

Furthermore, in order to improve the flexibility and practicality of the whole system and to improve the user experience, the instruction library may also be updated and adjusted after being constructed, namely, in response to that a mode switching instruction adjustment request is received, the instruction library may be updated based on the mode switching instruction adjustment request. In response to that a mode switching instruction adding request is received, the added mode switching instruction is written into the instruction library based on the mode switching instruction adding request; in response to that a mode switching instruction deletion request is received, a corresponding mode switching instruction is deleted from the instruction library based on the mode switching instruction deletion request; in response to that a mode switching instruction modification request is received, a corresponding mode switching instruction in the instruction library is modified based on the mode switching instruction modification request.

Some embodiments of the present application have the same method or the same steps as the above embodiments, and reference may be made to the related description of the above embodiments; therefore, the description will not be repeated here.

It may be seen from the above that some embodiments of the present application may realize multi-mode and multi-scenario management of the server by the user on the basis of satisfying the high-density requirements of the server without increasing the maintenance cost of the server.

It should be noted that there is no strict sequential execution order among the steps in the present application, and these steps may be executed simultaneously as long as the logical order is satisfied, or may be executed in a certain pre-set order; FIGS. 3 and 4 are merely schematic modes and do not represent that this is the only execution order.

The corresponding apparatus for the server management method is further provided by some embodiments of the present application, it is further made that the method is more practical. The apparatus may be illustrated from the perspective of a functional module and the perspective of hardware. The server management apparatus provided in some embodiments of the present application is described below, and the server management apparatus described below and the server management method described above may be referred to correspondingly.

Figure 5:
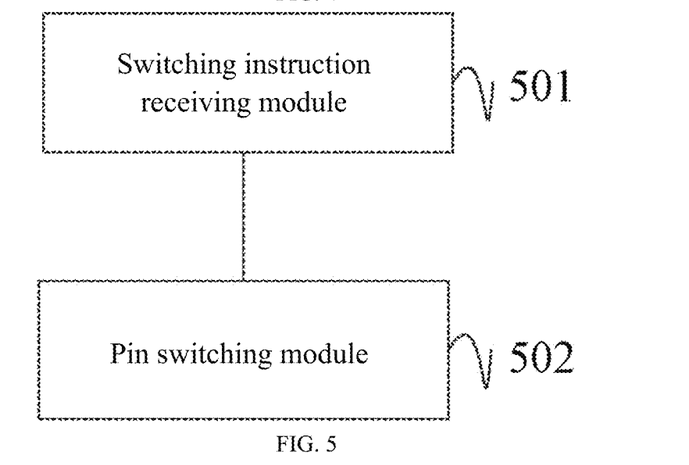
FIG. 5 is a structural diagram of an implementation of a server management apparatus according to some embodiments of the present application.

Based on the perspective of the functional module, firstly, referring to FIG. 5, FIG. 5 is a structural diagram of a server management apparatus in an implementation according to some embodiments of the present application, which may be applied to a state control switcher in any one of the above embodiments of the server management system, that is, the server management apparatus provided of some embodiments of the present application is embedded in the state control switcher; for example, the server management apparatus provided by some embodiments of the present application is disposed in CPLD, and the apparatus may include:

a switching instruction receiving module 501, configured to receive a mode switching instruction; and a pin switching module 502, configured to switch a target physical interface to be connected to a serial port function interface or a network function interface of a BMC monitoring management chip through a pin to respond to the mode switching instruction.

Figure 6:
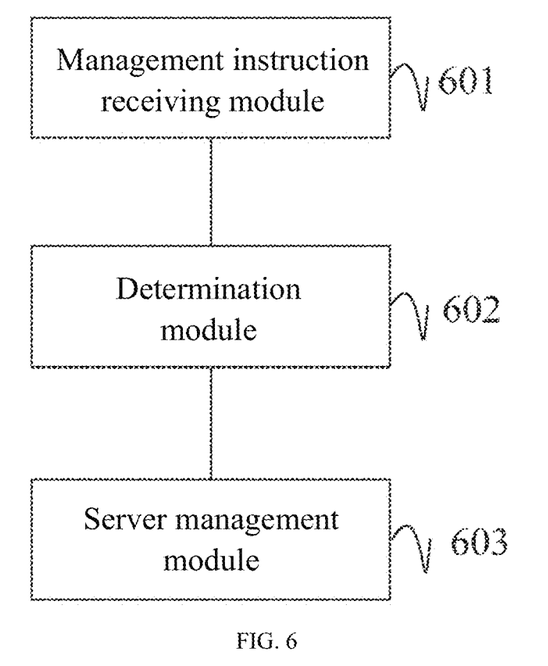
FIG. 6 is a structural diagram of another implementation of a server management apparatus according to some embodiments of the present application.

Secondly, referring to FIG. 6, FIG. 6 is a structural diagram of a server management apparatus in another implementation provided by some embodiments of the present application, which may be applied to the BMC monitoring management chip in any one of the above embodiments of the server management system, that is, the server management apparatus of some embodiments of the present application is embedded in the BMC monitoring management chip, and the apparatus may include:

a management instruction receiving module 601, configured to receive a server management instruction;

a determination module 602, configured to determine whether to send a mode switching instruction to a state control switcher based on a current management mode and a target management mode corresponding to the server management instruction; and a server management module 603, configured to in response to detecting that the current management mode is the target management mode, manage a server in a corresponding management mode through a target physical interface to respond to the server management instruction, wherein the management mode may include a serial port management mode and a network management mode.

As an implementation of the above embodiments, the above server management apparatus may further include an execution module; the execution module may include an instruction generation unit and an instruction sending unit.

The instruction generation unit is configured to generate a mode switching instruction in response to the current management mode being different from the target management mode corresponding to the server management instruction.

The instruction sending unit is configured to send a mode switching instruction to switch the target physical interface to be connected to the serial port function interface or the network function interface of the BMC monitoring management chip through the state control switcher.

As one implementation of some embodiments of the present application, the execution module may be further configured to directly respond to the server management instruction in response to the current management mode being the same as the target management mode corresponding to the server management instruction.

As another implementation of the above embodiments, the above server management apparatus may further include an instruction library and an instruction updating module.

The instruction library is pre-constructed and used for storing a plurality of mode switching instructions; the instruction updating module is configured to update the instruction library based on the mode switching instruction adjustment request in response to receiving the mode switching instruction adjustment request.

The contents of information interaction, execution process, and the like between units of some embodiments of the present application are based on the same concept as the above embodiments, and reference may be made to the description of the above embodiments for the contents, which will not be repeated herein.

It may be seen from the above that some embodiments of the present application may realize multi-mode and multi-scenario management of the server by the user on the basis of satisfying the high-density requirements of the server without increasing the maintenance cost of the server.

Figure 7:
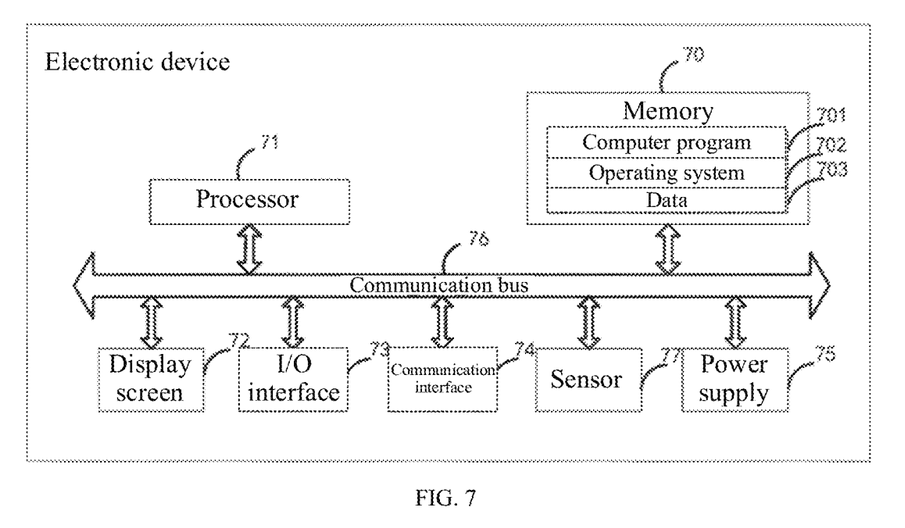
FIG. 7 is a structural diagram of an implementation of an electronic device according to some embodiments of the present application.

The above server management apparatus is described from the perspective of the functional module; an electronic device is further provided by the present application, which is described from the perspective of hardware. FIG. 7 is a structural diagram of an electronic device in an implementation according to some embodiments of the present application, as applicable to any one of the embodiments of the server management system described above. As shown in FIG. 7, the electronic device may include a memory 70 configured to store computer programs; and a processor 71 configured to implement steps of the server management method according to any one of the above embodiments in response to executing the computer programs.

The processor 71 may include one or more processing cores, such as a 4-core processor, or an 8-core processor; the processor 71 may also be a controller, microcontroller, microprocessor, or other data processing chip. The processor 71 may be implemented in the at least one form of hardware of digital signal processing (DSP), field-programmable gate array (FPGA), and programmable logic array (PLA). The processor 71 may further include a main processor and a co-processor; the main processor is a processor for processing data in a wake-up state and is also called a central processing unit (CPU); the coprocessor is a low-power processor for processing data in a standby state. In some embodiments, the processor 71 may be integrated with a graphics processing unit (GPU), the GPU is configured to be responsible for rendering and drawing the content that the display screen needs to display. In some embodiments, the processor 71 may further include an artificial intelligence (AI) processor, the AI processor is configured to process computing operations related to machine learning.

The memory 70 may include one or more non-volatile computer-readable storage media, and the non-volatile computer-readable storage media may be non-transitory. The memory 70 may further include high-speed random-access memory (RAM) as well as non-transitory memory, such as one or more magnetic disk storage devices and flash memory storage devices. The memory 70 may be an internal storage unit of the electronic device in some embodiments, such as a hard disk of the server. The memory 70 may further be an external storage device of the electronic device in other embodiments, for example, a plug-in hard disk provided on the server, a smart media card (SMC), a secure digital (SD) card, and a flash card. Further, the memory 70 may include both the internal storage unit and the external storage device of the electronic device. The memory 70 may not only be configured to store application software and various types of data installed in the electronic device, for example, the code or the like executing the program during the server management method but also be configured to temporarily store data that has been output or will be output. In some embodiments of the present application, the memory 70 is at least configured to store a computer program 701; the computer program, after being loaded and executed by the processor 71, may realize implementing the relevant steps of the server management method disclosed in any one of the preceding embodiments. In addition, the resources stored in the memory 70 may further include an operating system 702 and data 703, and the storage mode may be transient storage or permanent storage. The operating system 702 may include Windows, Unix, Linux, and the like. The data 703 may include but is not limited to, data corresponding to server management results and the like.

In some embodiments, the above electronic device may further include a display screen 72, an I/O interface 73, a communication interface 74, or referred to as a network interface, a power supply 75, and a communication bus 76. The display screen 72 and the I/O interface 73 such as a keyboard belong to a user interface, and a user interface may further include a standard wired interface, a wireless interface, and the like. In some embodiments, the display may be a light-emitting diode (LED) display, a liquid crystal display, a touch liquid crystal display, an organic light-emitting diode (OLED) touchpad, or the like. The display may also suitably be called a display screen or a display unit configured to display information processed in the electronic device and to display a visualized user interface. The communication interface 74 may include a wired interface and/or a wireless interface, such as a WI-FI interface, and Bluetooth interface, typically configured to establish communication connection between the electronic device and other electronic devices. The communication bus 76 may be a peripheral component interconnect (PCI) bus, an extended industry standard architecture (EISA) bus, or the like. The bus may be divided into an address bus, a data bus, a control bus, and the like. For ease of illustration, only one bold line is shown in FIG. 7, but this does not indicate that there is only one bus or one type of bus.

It may be understood by a person skilled in the art that the structure shown in FIG. 7 is not to be construed as limiting the electronic device and may include more or fewer assemblies than those shown, for example, a sensor 77 to implement various functions.

The functions of functional modules of the electronic device according to some embodiments of the present application may be implemented according to the method in the above method embodiments, and the implementing process the functions of functional modules may be referred to the relevant description of the above method embodiments and will not be described in detail herein.

It may be seen from the above that some embodiments of the present application may realize multi-mode and multi-scenario management of the server by the user on the basis of satisfying the high-density requirements of the server without increasing the maintenance cost of the server.

It may be understood that if the server management method in the above embodiments is implemented in the form of a software function unit and sold or used as an independent product, it may be stored in a non-transitory computer-readable storage medium. Based on such an understanding, the technical solution of the present application, either substantively or any part contributing to the related art, or all or part of the technical solution, may be embodied in the form of a software product; the computer software product is stored in a storage medium for executing all or part of the steps of the method of various embodiments of the present application. The storage medium stated above includes a USB flash disk, a removable hard disk, a read-only memory (ROM), RAM, an electrically erasable programmable ROM (EEPROM), a register, a hard disk, a multimedia card, a card-type memory (such as an SD or DX memory), a magnetic memory, a removable magnetic disk, a CD-ROM, a magnetic disk, or an optical disk, and various media which may store program codes.

Based on this, a non-transitory readable storage medium is further provided by some embodiments of the present application, which stores computer programs, in response to that the computer programs are executed by a processor, the steps of the server management method of any one of the embodiments stated above are executed.

Various embodiments are described in the specification in a progressive manner, with each embodiment focusing on differences from the other embodiments, and with reference to the same or similar parts of the various embodiments. The hardware in the embodiments includes apparatuses and electronic devices is relatively simple to describe as it corresponds to the methods of the embodiments stated above, related information is referred to the description of the methods section.

A person skilled in the art may further be aware that the units and algorithmic steps of each example described in conjunction with the embodiments disclosed herein may be implemented in electronic hardware, computer software, or a combination of the two, and that the composition and steps of each example have been described generally by function in the above description to clearly illustrate the interchangeability of hardware and software. Whether such functions are implemented as hardware or software depends upon the application and design constraints of the technical solutions. A person skilled in the art may implement the described functions in varying ways for each application, but such an implementation should not be considered outside the scope of the present application.

The server management method, apparatus and system, the electronic device, and the readable storage medium provided in the present application are described in detail above. The principles and implementations of the present application have been set forth herein using examples. The above embodiments have been set forth only to aid in the understanding of the method and core ideas of the present application. It should be noted that a person skilled in the art may make numerous improvements and modifications to the present application without departing from the principles of the present application. Such improvements and modifications are intended to be within the scope of protection of the claims of the present application.

The invention claimed is:

1. A server management method applied to the BMC monitoring management chip in the server management system comprising:
   in response to receiving a server management instruction, determining whether to send a mode switching instruction to the state control switcher based on a current management mode and a target management mode corresponding to the server management instruction; and
   in response to detecting that the current management mode is the target management mode, managing a server in a corresponding management mode through the target physical interface to respond to the server management instruction; wherein the management mode comprises the serial port management mode and the network management mode,
   wherein before in response to receiving the server management instruction, determining whether to send the mode switching instruction to the state control switcher based on the current management mode and the target management mode corresponding to the server management instruction, the server management method further comprises:
   pre-constructing an instruction library, wherein the instruction library is configured to store a plurality of mode switching instructions; and
   in response to receiving a mode switching instruction adjustment request, updating the instruction library based on the mode switching instruction adjustment request;
   in response to receiving the mode switching instruction adjustment request, updating the instruction library based on the mode switching instruction adjustment request comprises:
   in response to receiving a mode switching instruction adding request, writing an added mode switching instruction into the instruction library based on the mode switching instruction adding request; and/or
   in response to receiving a mode switching instruction deletion request, deleting the mode switching instruction corresponding to the mode switching instruction deletion request from the instruction library based on the mode switching instruction deletion request; and/or
   in response to receiving a mode switching instruction modification request, modifying the mode switching instruction corresponding to the mode switching instruction modification request in the instruction library based on the mode switching instruction modification request.

2. The server management method according to claim 1, wherein determining whether to send the mode switching instruction to the state control switcher based on the current management mode and the target management mode corresponding to the server management instruction comprises: generating the mode switching instruction in response to the current management mode being different from the target management mode corresponding to the server management instruction; and sending the mode switching instruction to switch the target physical interface to be connected to the serial port function interface or the network function interface of the BMC monitoring management chip through the state control switcher.

3. The server management method according to claim 1, wherein determining whether to send the mode switching instruction to the state control switcher based on the current management mode and the target management mode corresponding to the server management instruction comprises: directly responding to the server management instruction in response to the current management mode being the same as the target management mode corresponding to the server management instruction.

4. The server management method according to claim 1, wherein the mode switching instruction stored by the instruction library has an instruction identification for identifying a mode switch relationship; the mode switching instruction sent to the state control switcher is a target instruction corresponding to a target mode switching relationship located and called in the instruction library according to the target mode switching relationship for switching the current management mode to the target management mode corresponding to the server management instruction.

5. An electronic device, comprising: a memory, configured to store computer programs; and a processor, configured to implement steps of the server management method according to claim 1 in response to executing the computer programs stored in the memory.

6. A readable storage medium storing computer programs, wherein the computer programs, in response to being executed by a processor, implement steps of the server management method according to claim 1.

* * * * *